United States Patent [19]

Dischert

[11] 4,030,118
[45] June 14, 1977

[54] COLOR ENCODING CAMERA UTILIZING COMB FILTERING FOR COLOR SIGNAL SEPARATION

[75] Inventor: Robert Adams Dischert, Burlington, N.J.

[73] Assignee: RCA Corporation, New York, N.Y.

[22] Filed: Feb. 11, 1970

[21] Appl. No.: 10,323

[52] U.S. Cl. .................................... 358/5; 358/44
[51] Int. Cl.² ...................... H04N 1/22; H04N 9/07
[58] Field of Search ......... 178/5.4 ST; 350/162 SF; 358/5, 44

[56] References Cited

UNITED STATES PATENTS

| 3,378,633 | 4/1968 | Macovski | 178/5.4 ST |
| 3,419,672 | 12/1968 | Macovski | 178/5.4 ST |
| 3,531,584 | 9/1970 | Bell | 178/5.4 ST |
| 3,647,943 | 3/1972 | Marshall | 178/5.4 ST |

Primary Examiner—George G. Stellar
Attorney, Agent, or Firm—Eugene M. Whitacre; William H. Meagher

[57] ABSTRACT

Colored light from a scene is spatially encoded onto a photosensitive surface by a striped spatial color encoding filter assembly. The filter assembly comprises a plurality of superimposed gratings for encoding a plurality of colors, at least one grating having its stripes disposed angularly from the direction of scanning lines on the photosensitive surface such that a color representative carrier wave of different phase is produced during successive scanning intervals. The plurality of color representative carrier waves produced by scanning of the imaged gratings on the photosensitive surface may have the same frequency during any line scanning interval thus minimizing the spectrum required to convey full color information, and are separated from each other by comb filter apparatus for producing different color representative signals.

33 Claims, 9 Drawing Figures

INVENTOR
Robert A. Dischert
BY Eugene M. Whitacre
ATTORNEY

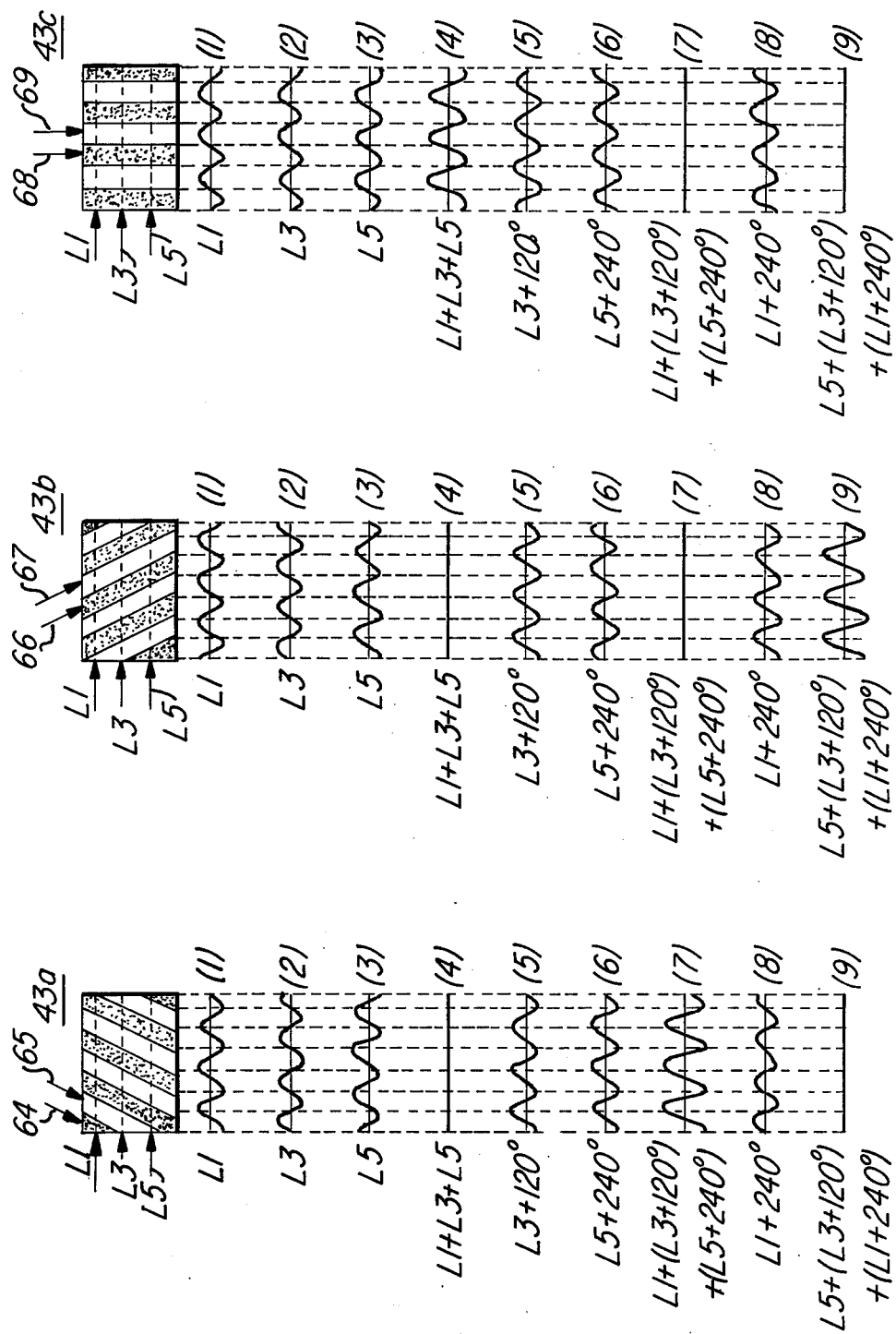

COLOR ENCODING CAMERA UTILIZING COMB FILTERING FOR COLOR SIGNAL SEPARATION

BACKGROUND OF THE INVENTION

This invention relates to a color encoding system utilizing a spatial color encoding filter and comb filter apparatus for producing color representative signals.

It is known that a striped spatial color encoding filter may be utilized to encode a plurality of colors onto a photosensitive surface such as black and white film in a film camera or the photosensitive electrode of an image pickup device in a television camera. One method of encoding colors in this fashion is to utilize an encoding filter assembly comprising a first grating of alternate cyan and transparent strips for encoding red light as amplitude modulation of a first carrier wave and second grating superimposed over the first grating comprising alternate transparent and yellow strips for encoding blue light as amplitude modulation of a second carrier wave. The gratings may have the same spatial frequency, i.e., the same line density of strips in a direction normal to the direction of the strips, with the gratings angularly disposed relative to the direction of the scanning lines such that when the imaged stripe pattern on the photosensitive electrode is scanned by an electron beam the red and blue color representative carrier waves have different frequencies. Thus, the carrier waves may be separately bandpass filtered for producing separate red and blue color representative signals. The overall transmissivity of the filter stripes may be selected such that a brightness signal is contained in the average transmission of the filter. This brightness signal may be bandpass limited to approximately 3 MHz. The stripe widths and angle of inclination of the stripes of each grating relative to the scanning direction may be selected such that the red carrier wave is at 3.5 MHz and the blue carrier wave is at 5MHz, with a 500 KHz bandwidth allotted for the color sideband information of each color carrier wave. It can be seen that with a 3 MHz luminance signal the required frequency spectrum must extend to 5.5 MHz to include the brightness signal and two color carrier waves and their associated sidebands. The 5.5 MHz bandwidth requirement is such that it approaches the limit of the useful frequency response of available image pickup devices such as vidicon camera tubes. In addition, problems may be encountered in that the gamma characteristics of the pickup device for the relatively widely separated frequencies of the color carrier waves will be different, and the separate color carrier waves may not track each other with changes in scene illumination.

Another method of encoding colors utilizing a stripe filter to encode the light reaching the photosensitive electrode of an image pickup tube is to phase modulate a carrier wave periodically with different color information. In such a method several colors modulate different phases of a color carrier wave. A major problem encountered in a color encoding system utilizing phase modulation of a carrier wave is that nonlinearity of the optical system and the image pickup tube make it essential that a reference wave accompany the color information through the system in order to be available for use in demodulation of the phase modulated carrier wave because slight deviation of the phase between the signal and reference waves results in erroneous color signals being produced by the demodulation circuits. Various methods have been proposed for providing this reference wave such as, for example, a reference grating superimposed over the color encoding grating such that scanning of the imaged encoding filter pattern and grating pattern produces a reference wave component in the composite signal derived from the image pickup tube during scanning. This method has a disadvantage in that the reference grating blocks illumination and results in lower efficiency of light transmission by the optical apparatus. Phase modulated systems in general have a main disadvantage in that even a slight undesirable phase change of the reference wave with respect to the phase modulated color carrier wave results in erroneous color signals being produced.

Thus, while it is desirable to amplitude modulate a carrier wave with color information because of the insensitivity of the amplitude modulated color wave to phase changes brought about by system nonlinearity, it has been necessary to utilize separate spectral regions for this, resulting in an undesirably narrow banded luminance signal in order to include even two relatively narrow band color signals. Further, while a phase modulated color carrier can provide full color information in a smaller spectral range than an amplitude modulation system, the phase modulated carrier system is unsatisfactory in that it is susceptible to phase changes caused by system nonlinearity.

Accordingly, it is an object of this invention to provide a color encoding system in which full color information of a scene is included as amplitude modulation of a plurality of carrier wave components and their associated sidebands occupying a common range of frequencies.

It is another object of this invention to provide a color encoding system in which a plurality of colors are encoded and appear as amplitude modulation of a plurality of color carrier wave components, the plurality of different color representative components being separated from each other by means including comb filter apparatus.

A system is provided for producing signals representative of the color of a scene. A spatial color encoding filter comprising superimposed encoding stripe gratings is disposed such as to spatially separate different colored light directed to a photosensitive electrode of an image pickup device. The stripes of at least one grating are disposed angularly with respect to the stripes of any other grating and to the direction of the scanning lines of the image pickup device such that the composite signal including a plurality of amplitude modulated color representative carrier wave components derived from the image pickup tube as its photosensitive electrode is scanned includes an amplitude modulated color representative carrier wave component that is of different phase on successively scanned lines. Apparatus is coupled to the image pickup device for combining signals derived from successively scanned lines and for separating the color representative carrier wave components of the composite signal for producing separate signals each representative of a different color of the scene.

In another embodiment of the invention a color encoding black and white film camera is provided, the camera including a striped spatial color encoding filter assembly placed between the scene to be encoded and the black and white film. The filter assembly includes first and second superimposed encoding gratings having stripe widths and having the direction of their stripes angularly disposed from each other such that an image of the encoded film produces, when subsequently scanned, a composite signal including two amplitude modulated color representative carrier wave components having the same frequency.

A more detailed description of the invention is given in the following specification and accompanying drawings of which:

FIGS. 4a, 4b and 4c are diagrams representative of the color encoding filter assembly utilized in the system shown in FIG. 3 and waveforms obtained at various points in the system shown in FIG. 3.

DESCRIPTION OF THE INVENTION

Figure 1:
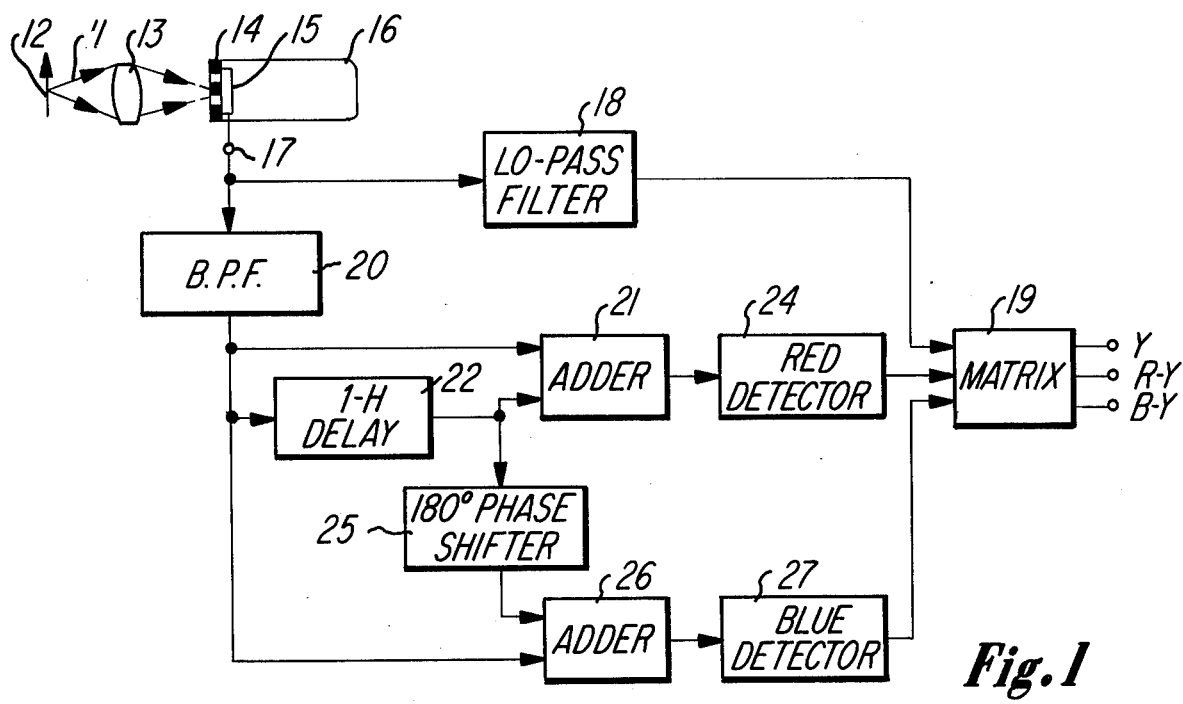
FIG. 1 is a block diagram showing one embodiment of a system for producing color representative signals.

FIG. 1 is a block diagram showing a system for producing color representative electrical signals according to the invention. Light rays 11 from an object 12 are directed by an objective lens 13 to form an image at a photosensitive electrode 15 of an image pickup device 16. Image pickup device 16 may be a vidicon, for example, operated in a conventional manner and having its electron beam scanned over photosensitive electrode 15 at conventional television field and line scanning rates. A color encoding filter assembly 14 is disposed adjacent photosensitive electrode 15 either inside or outside the vidicon to filter the light reaching the electrode. It is to be understood that filter assembly 14 may be disposed outside of vidicon 16 and separated from photosensitive electrode 15 by a fiber optics faceplate, or, it may be disposed some distance from the electrode and imaged thereon by any suitable relay lens assembly. Color encoding filter assembly 14 comprises two superimposed gratings each of which encodes light of a different color, which colors may be red and blue. The overall transmissivity of the encoding filter assembly 14 is such that it is representative of the brightness of the scene. Color encoding filter assembly 14 will be described in detail subsequently in connection with FIGS. 2a, 2b and 2c.

As the electron beam of vidicon 16 is scanned over the photosensitive electrode 15, a composite signal including brightness and encoded color information of the object 12 is obtained from an output terminal 17. The composite signal obtained from terminal 17 is coupled to a low-pass filter 18 which may have a bandpass of 0 to 3.5 MHz. These relatively low frequency signal components obtained from low-pass filter 18 constitute a brightness representative signal which is coupled to an input terminal of a matrix 19.

The composite signal obtained from terminal 17 is also coupled to a bandpass filter 20 which has a bandpass of 3.5 MHz to 4.9 MHz, centered around a nominal color carrier frequency of 4.2 MHz. The color carrier frequency for each encoded color is determined by the period of the stripes of the respective color encoding gratings of encoding filter 14, the size of the scanned raster at photosensitive electrode 15 and the rate of scanning of the electron beam of vidicon 16.

Obtained at the output of bandpass filter 20 are the amplitude modulated red and blue representative carrier waves and their associated sidebands extending 700 KHz above and below the nominal carrier wave frequency. The color representative carrier waves and their sidebands are coupled to an input terminal of a signal adder 21, an input terminal of a 1-H delay line 22 and an input terminal of a second signal adder 26. Delay line 22 has a delay equal to the period of one horizontal scanning interval, which is 63.5 microseconds in the United States. The signal obtained from delay line 22 is coupled to an input terminal of signal adder 21. Thus signal adder 21 receives at its input terminals signals from the line being scanned and signals from the previously scanned line. Signal adder 21 combines these two signals and produces a carrier wave and sidebands representative of red light of the scene. A detailed description of how the red representative signal is produced will be described in connection with FIGS. 2a, 2b and 2c. The red representative carrier wave and its sidebands are coupled to a red signal envelope detector 24 which demodulates the signal and produces a red representative signal which is coupled to an input terminal of matrix 19.

The delayed color representative carrier waves obtained from delay line 22 are also coupled to a phase shifting or inverting circuit 25 which shifts the phase of the color carrier waves by 180 degrees. The phase shifted color carrier waves and their associated sidebands are coupled to an input terminal of signal adder 26 which combines the delayed phase shifted wave with the undelayed color carrier wave obtained directly from bandpass filter 20 for producing a carrier wave and sidebands representative of blue light. A detailed description of how this blue representative carrier wave is produced will be described subsequently in connection with FIGS. 2a, 2b and 2c. The blue representative carrier wave is coupled to a blue signal envelope detector 27 which demodulates the wave and produces a blue representative signal which is coupled to an input terminal of matrix 19. In matrix 19 the brightness, red and blue representative signals are combined for producing a brightness signal (Y), and two color difference signals (R-Y) and (B-Y) which are suitable for application to a color television receiver for reproducing the scene in its original color or for application to an encoder for producing a composite signal for application to a television transmitter.

Figure 2A:
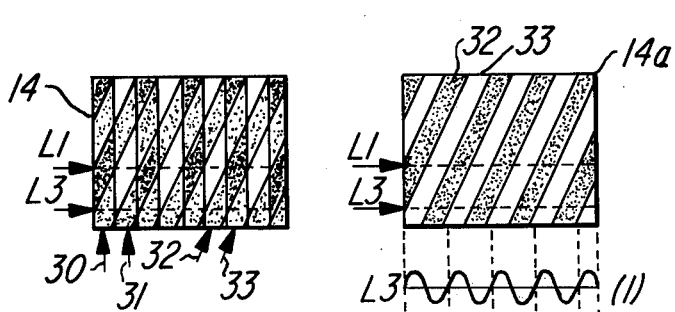
FIGS. 2a, 2b and 2c are diagrams representative of the color encoding filter assembly utilized in the system shown in FIG. 1, and waveforms obtained at various points in the system shown in FIG. 1.
Figure 2B:
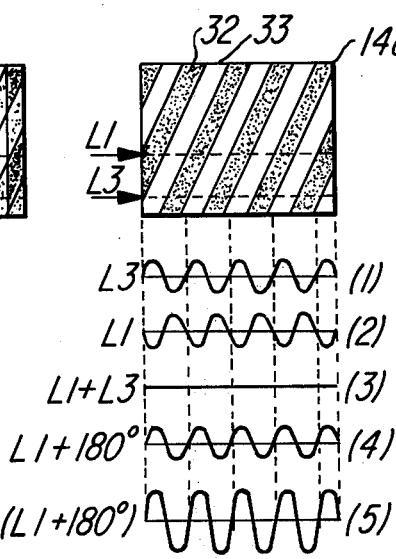
Figure 2C:
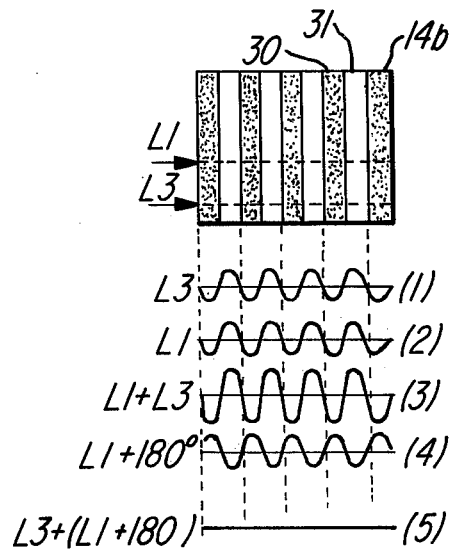

FIGS. 2a, 2b and 2c are diagrams representative of the color encoding filter assembly utilized in the color encoding system shown in FIG. 1. Included in FIGS. 2b and 2c are waveforms spaced in relation to the particular encoding stripes of the encoding grating which generate the signals and which wave forms are coupled to the signal adders 21 and 26.

FIG. 2a shows a color encoding filter assembly 14 which may be utilized in the system shown in FIG. 1. Encoding filter assembly 14 comprises a first grating having a pattern of alternate cyan stripes 30 and transparent stripes 31 and a second grating superimposed over the first and having a pattern of alternating yellow stripes 32 and transparent stripes 33. It should be noted that yellow stripes 32 are disposed at an angle relative to cyan stripes 30. Indicated on FIG. 2a are two successive scanning lines L1 and L3 shown as dotted lines extending across the surface of filter 14. Scanning lines L1 and L3 may be any two successive scanning lines of a given field. In this embodiment the cyan-transparent stripe pairs 30—31 are disposed normal to the direction of scanning lines L1 and L3 and yellow-transparent stripe pairs 32—33 are disposed at less than a right angle to the scanning lines. The width of cyan-transparent stripe pair 30—31 is selected such that a carrier wave of 4.2 MHz is generated during the horizontal scanning intervals. As mentioned previously, cyan stripes 30 block red light and pass light of all other colors and transparent stripes 31 pass all light. Therefore, in the presence of red light from the scene a carrier wave having frequency determined by the stripe pair width and the scan speed will be generated, the amount of red light determining the amplitude modulation of the carrier wave.

The angle of inclination of yellow-transparent stripes 32—33 is selected such that scanning of the imaged yellow-transparent encoding grating produces a carrier wave which undergoes a 180° phase shift on successively scanned lines. This enables the blue representative carrier wave to be separated from the red representative carrier wave by the comb filter apparatus in a manner to be described in conjunction with FIGS. 2b and 2c. The width of the yellow-transparent stripe pairs 32—33 is selected such that the blue representative carrier wave has the same carrier frequency of 4.2 MHZ during any scanning line as the red representative carrier wave. Thus, it can be seen that the yellow-transparent stripe pair must have a width less than that of the cyan-transparent stripe pair by a factor corresponding to the cosine of the angle between the longitudinal directions of the yellow and cyan stripes in order for both gratings to produce carrier waves having the same frequency during any scanning line. The yellow stripes block blue light and pass all other colored light. Therefore, in the presence of yellow light a carrier wave of 4.2 MHz will be generated as the imaged stripe pattern is scanned, the amount of yellow light determining the amplitude modulation of the carrier wave.

Referring to FIG. 2b, there is shown an encoding grating 14a which is one of the gratings of encoding filter assembly 14 shown in FIG. 2a. Encoding stripes 14a comprises a pattern of alternate yellow stripes 32 and transparent stripes 33. The effect of encoding grating 14a on producing a blue representative signal in the system shown in FIG. 1 will be described in connection with waveforms (1)—(5) shown in FIG. 2b. FIG. 2b(1) shows a waveform generated during scanning interval L3. This interval corresponds to the interval as the electron beam scans the encoding filter pattern along the scanning line L3 shown in FIG. 2b. The waveform of FIG. 2b. (1) is coupled directly from banpass filter 20 to signal adder 21 FIG. 1. FIG. 2b (2) shows a waveform generated as the electron beam is scanned along the preceding line L1.

Thus, during the time line L3 is being scanned, the output is the signal generated by the scanning of the preceding line L1 obtained from delay line 22 and is also shown in FIG. 2b(2).

The waveforms shown in FIGS. 2b(1) and 2b(2) are added by signal adder 21. As previously mentioned and as can be seen from inspection of encoding grating 14a in FIG. 2b, the angle of the yellow-transparent stripe pair 32 and 33 is selected such that the carrier wave produced during successive intervals is phase shifted by 180°. Thus the combining of the waveform shown in FIG. 2b(1) with the waveform shown in FIG. 2b(2) by signal adder 21 produces the waveform shown in FIG. 2b(3) at the output terminal of adder 21. The waveform shown in FIG. 2b(3) shows that the addition of the waveforms obtained from scanning line L1 and scanning line L3 results in no signal since the two signals, being 180 degrees out of phase, cancel each other. Thus there will be no red representative output signal obtained from adder 21 as a result of the blue representative signals generated by encoding grating 14a.

The waveform obtained from delay line 22, which is the waveform shown in FIG. 2b(2), is also coupled to phase shifter 25 which shifts the phase of that waveform by 180 degrees. This phase shifted waveform is coupled to an input terminal of signal adder 26. This phase shifted waveform is shown in FIG. 2b(4). Also coupled to signal adder 26 directly from bandpass filter 20 is the undelayed waveform obtained during scanning line L3. Signal adder 26 combines these waveforms shown in FIGS. 2b(1) and 2b(4). The resultant waveform representing the sum of these waveforms is shown by the waveform in FIG. 2b(5). Because the two signals are in phase they add to produce a blue representative signal as shown by the waveform in FIG. 2b(5). This waveform is coupled to the blue signal detector 27 and the detected blue representative signal is coupled to matrix 19. It is to be understood that in the absence of blue light there will be no signal obtained from either the red signal detector 24 or the blue signal detector 27, but in the presence of blue light there will be a signal obtained only from blue detector 27. By selecting the angle of inclination of the yellow-transparent stripes 32 and 33 to be such that the blue representative signal is displaced 180 degrees on successively scanned lines, the comb filter apparatus including delay line 22, phase shifter 25, signal adder 21 and signal adder 26 enables the blue representative signal to be obtained only from signal adder 26 in the blue signal processing channel.

Referring to FIG. 2c, there is illustrated an encoding grating 14b which is a part of encoding filter 14 of FIG. 2a comprising alternate cyan stripes 30 and transparent stripes 31. FIGS. 2c(1) through 2c(5) show waveforms associated with the red encoding stripes 14b. It is to be noted that the cyan and transparent stripes 30 and 31 are disposed normal to the direction of scanning lines L1 and L3 shown in FIG. 2c. With this arrangement there will be no phase change of the red color modulated carrier wave on successive scanning lines. FIG. 2c(1) shows a waveform of a signal obtained from scanning lines L3, which signal is obtained from bandpass filter 20 and is coupled directly to an input terminal of signal adder 21 and an input terminal of signal adder 26. The waveform shown in FIG. 2c(2) is the waveform generated by scanning line L1 and which is obtained one scanning interval later from delay line 22. This delayed signal is coupled to a second input terminal of signal adder 21. FIG. 2c(3) shows the waveform obtained from several adder 21 as waveforms 2c(1) and 2c(2) are obtained. There is no phase difference between the waveforms shown in FIG. 2c(1) and 2c(2), therefore the resultant waveform is the sum of the two waveforms. This red representative color carrier wave is detected by red signal detector 24 and a red representative signal is coupled from detector 24 to matrix 19.

The delayed waveform obtained from delay line 22 is also coupled to phase shifter 25 which shifts the phase of the signal obtained from scanning line L1 by 180 degrees as shown in FIG. 2c(4). Signal adder 26 combines the waveforms shown in FIGS. 2c(1) and 2c(4)

for producing the waveform shown in FIG. 2c(5). Since the two waveforms combined by signal adder 26 are 180° out of phase the resultant waveform shown in FIG. 2c(5) is zero. Thus in the presence of red light there is no signal produced by blue signal adder 26 and no signal is coupled from blue signal detector 27 to matrix 19.

The operation of the comb filter and detector circuit has been described separated with respect to the signals produced by the blue encoding grating filter 14a and red encoding grating 14b. However, it is to be understood that these gratings are superimposed as described in connection with FIG. 2a and that the processing of the red and blue signals occurs at the same time. The signal processing shown in FIG. 1 produces separate red and blue color representative signals from a composite signal including red and blue color modulated carrier waves having the same frequency. It is to be understood that by utilizing delay line 22 in the comb filter circuit the vertical color resolution will be one-half of that obtainable if the signals from two successive scanning lines were not combined. However, this decrease in vertical color resolution is not noticeable and does not adversely affect the reproduced color scene because the color signal bandwidth is relatively narrow relative to the resolution provided by the 525 line scanning system utilized in the United States. Also, it is to be noted that the luminance signal obtained from low-pass filter 18 is not decreased in vertical resolution as this signal is not combined with signals from preceding or succeeding scan lines.

Figure 3:
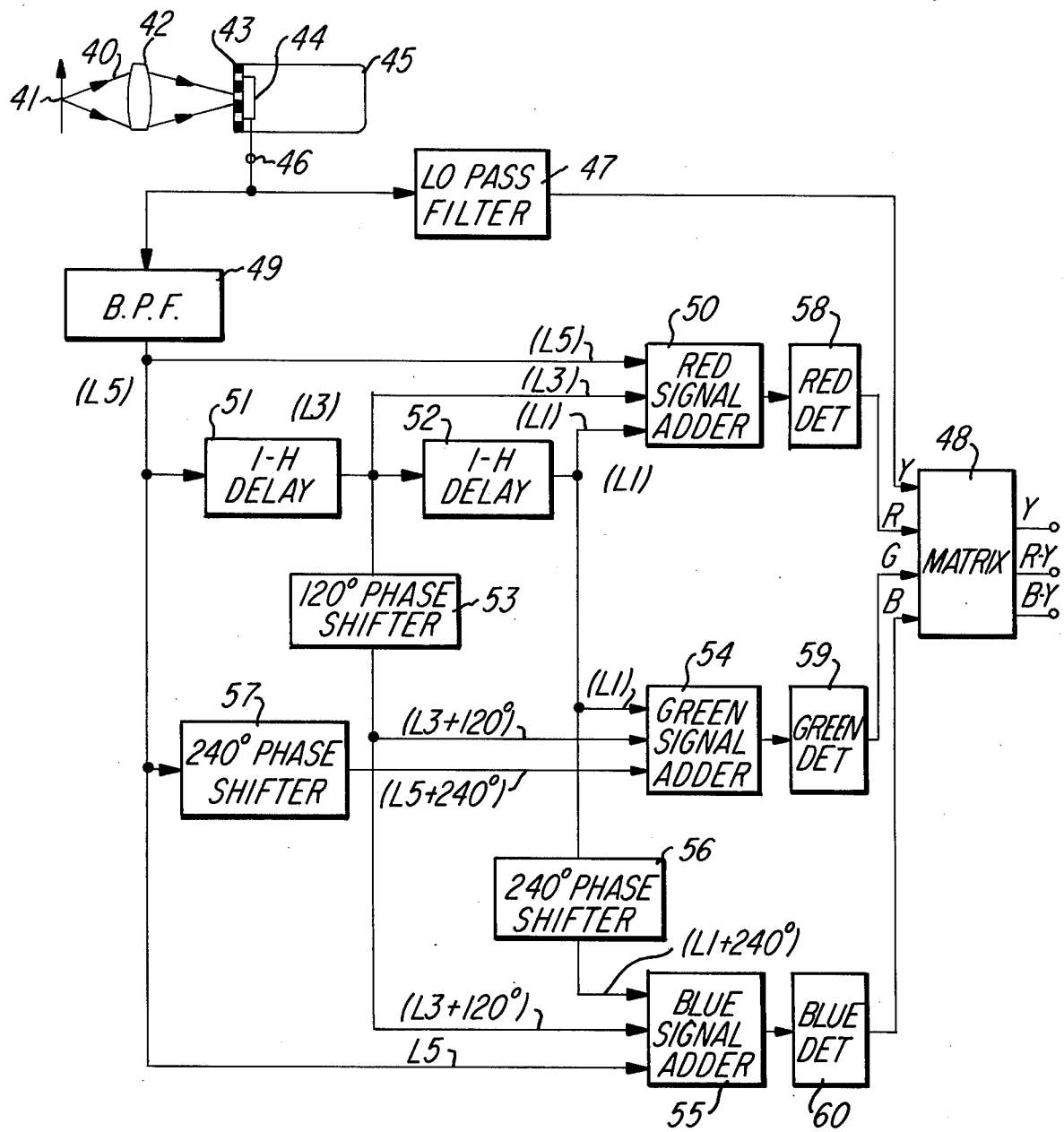
FIG. 3 is a block diagram showing another embodiment of a system for producing color representative signals.

FIG. 3 is a block diagram of another system for producing color representative signals. The embodiment shown in FIG. 3 differs from that shown in FIG. 1 in that the system of FIG. 3 utilizes a color encoding filter assembly having three superimposed color encoding gratings for encoding three different colors.

Light rays 40 from an object 41 are directed by an objective lens 42 to a photosensitive electrode 44 of an image pickup device 45. Image pickup device 45 may be, for example, a vidicon camera pickup tube operated in a conventional manner and having its beam scan a raster on photosensitive electrode 44 at conventional television line and field scanning rates. A striped spatial color encoding filter assembly 43 is disposed between the object 41 and photosensitive electrode 44 for spatially encoding the colored light directed to the electrode. Color encoding filter assembly 43 comprises three superimposed color encoding gratings for encoding red, blue and green light from the scene. Color encoding filter 43 will be described in more detail subsequently in connection with FIGS. 4a, 4b and 4c. The overall transmissivity of the stripes of color encoding filter assembly 43 is selected such that the average transmissivity of the filter is representative of the brightness component of the scene represented by object 41. In operation a composite signal including three color carrier wave components and a brightness signal component is obtained from an output terminal 46 of vidicon 45 as photosensitive electrode 44 is scanned by an electron beam.

The composite signal obtained from terminal 46 is coupled to a low-pass filter 47 which has a bandwidth of 0 to 3.5 MHz. The signal obtained for bandpass filter 47 is a brightness signal Y which is coupled to an input terminal of a matrix 48.

The composite signal obtained from terminal 46 is also coupled to a bandpass filter 49 which has a bandpass from 3.5 MHz to 4.9 MHz, providing a 700 KHz bandpass above and below a center frequency of 4.2 MHz. Bandpass filter 49 separates the amplitude modulated color carrier component waves and their associated sidebands from the lower frequency brightness signal components.

The remainder of the blocks of the system shown in FIG. 3 describe a comb filter for separating the three amplitude modulated color representative signals for producing three separate red, green and blue color representative signals. The signal obtained from bandpass filter 49 is coupled directly to a red signal adder 50, a delay line 51, a phase shifter 57 and a blue signal adder 55. The signal obtained from delay line 51 is coupled to red signal adder 50, a delay line 52 and a phase shifter 53. The signal obtained from delay line 52 is coupled to red signal adder 50, a green signal adder 54, and a phase shifter 56. The delay time of each of delay lines 51 and 52 is equal to a scanning interval of one horizontal scanning line, which is 63.5 microseconds in the United States.

The signal obtained from phase shifter 53 is coupled to green signal adder 54 and blue signal adder 55. the signal obtained from phase shifter 57 is coupled to green signal adder 54. The signal obtained phase shifter 56 is coupled to blue signal adder 55. Thus, the signals derived from three successively scanned lines of a television field are simultaneously coupled to each of the signal adders 50, 54 and 55, each of which sums the three signals applied to it for providing a resultant signal. The signal obtained from red signal adder 50 is coupled to a red color envelope detector 58 which provides a demodulated red color representative signal which is coupled to an input terminal of matrix 48. Similarly, the resultant signals obtained from green and blue signal adders 54 and 55 are coupled to a green color envelope detector 59 and a blue color envelope detector 60, respectively, for providing green and blue color representative signals which are coupled to respective input terminals of matrix 48. Matrix 48 combines the luminance, red, green and blue signals for providing at its output terminals a luminance signal Y, and R-Y color difference signal and a B-Y color difference signal, which signals are suitable for application to a color television display device for reproducing the scene in its original color.

The detailed operation of the encoding system shown in FIG. 3 will be described in conjunction with FIGS. 4a, 4b and 4c. FIGS. 4a, 4b and 4c show three striped encoding gratings 43a, 43b and 43c respectively. It is to be understood that in operation these three gratings are superimposed on each other and together form the encoding grating 43 shown in FIG. 3. The encoding system shown in FIG. 3 includes a comb filter which produces three color representative signals from three color representative carrier wave components, two of which change phase by 120° on successive scanning lines. The angle of inclination of the respective stripes of the encoding gratings determines the phase shift of the respective color representative carrier waves. Thus, grating 43a of FIG. 4a has its stripes inclined at such an angle to the direction of scan that a carrier wave is generated which shifts phase by 120° in a first direction from one scanning line to the other. Grating 43b of FIG. 4b has its stripes inclined at an angle from the direction of scan equal and opposite to the inclination angle of the grating 43a stripes, thus generating a carrier wave which shifts phase in a direction opposite to that of the grating 43a related carrier wave by 120° from one scanning line to the next. The width of the stripe pairs of gratings 43a and 43b is equal and is selected such that each grating generates a carrier wave component at 4.2 MHz.

FIG. 4c shows an encoding grating 43c comprising a pattern of alternate cyan stripes 68 and transparent stripes 69. This grating is disposed such that stripes 68 and 69 are disposed normal to the direction of successive scanning lines L1, L3 and L5 of a given scanning field. The cyan and transparent grating encodes red light and the amplitude of the carrier wave produced as the image pattern of grating 43c is scanned is proportional to the amount of red light impinging upon the grating. The stripes of encoding grating 43c being normal to the direction of scanning, no phase change of the red color amplitude modulated carrier wave will occur from one scanning line to another. The period of stripe pairs 68–69 is selected such that as their image on photosensitive electrode 44 is scannned, a red representative carrier wave is produced at 4.2 MHz. FIG. 4c(1), 4c(2) and 4c(3) show waveforms representative of the red carrier wave derived from three successive scanning lines L1, L3 and L5, respectively, shown as dotted lines in FIG. 4c. As indicated in FIG. 3 the signal from line L1 is that obtained from delay line 52 and represents a signal which has been delayed two scanning lines. The waveform shown in FIG. 4c(2) is representative of a red carrier wave derived by scanning line L3 and obtained from delay line 51 which delays the L3 signal one horizontal scanning interval. The waveform shown in FIG. 4c(3) is representative of an undelayed signal obtained directly from bandpass filter 49. These three signals are coupled to signal adder 50 and are combined to produce a resultant signal represented by the waveform in FIG. 4c(4). Since the three waveforms are in phase, their resultant is a signal of relatively large amplitude representative of the red color information obtained from three successively scanned lines. This resultant carrier wave is coupled to red signal envelope detector 58 which demodulates the wave and provides a red color representative signal which is coupled to matrix 48.

FIG. 4c(7) shows a resultant waveform which is obtained by adding the signals present at the input terminals of the green signal adder 54. The signals which are added here are shown in FIGS. 4c(1), 4c(5) and 4c(6). Phase shifter 53 and phase shifter 57 shift the phases of the waveforms obtained from scanning lines L3 and L5 respectively such that there is a 120° phase shift between the three carrier waves coupled to signal adder 54. Thus, the comb filter operates to provide zero red representative signal out of green signal adder 54. Similarly FIG. 4c(9) shows a waveform representative of the red signal component obtained from the output terminal of blue signal adder 55. This signal is the resultant of adding the waveforms shown in FIG. 4c(3), 4c(5) and 4c(8). By referring to FIG. 3 is can be seen that the signals produced as a result of scanning the red color encoding grating 43c are shifted in phase by the comb filter such that the three signals coupled to signal adder 55 are phase shifter 120° with respect to each other, thereby providing a zero signal when combined.

FIG. 4a shows an encoding grating 43a comprising a pattern of alternating megenta stripes 64 and transparent stripes 65. The magenta stripes 64, block green light and pass all other colors and the transparent stripes pass all colors. Therefore, grating 43a serves to encode green light, the amount of green light determining the amplitude modulation of the green color representative carrier wave. The stripes of grating 43a and the width of a stripe pair 64–65 of grating 43a are selected such that the phase of the green carrier wave is shifted by 120° during successive scanning intervals, the carrier waves being at the same frequency of 4.2 MHz as the carrier waves generated by the other encoding gratings 43b and 43c during any FIGS. 4a(1), 4a(2) and 4a(3) show waveforms representative of the amount of green light present during scanning of successive scanning lines L1, L3 and L5. FIG. 4a(4) shows the resultant of these three waveforms as they are combined by signal adder 50. The three waveforms being 120° out of phase, the resultant signal is zero, thereby generating no output signal from the red signal adder 50.

FIG. 4a(7) shows the resultant waveform obtained from green signal adder 54 as the waveforms shown in FIGS. 4a(1), 4a(5) and 4a(6) are coupled to signal adder 54 and combined with each other. The comb filter apparatus provides a phase shift for these signals such that the three color carrier waves representative of green color are in phase at the input terminals of green signal adder 54 thereby resulting in a relatively large green representative carrier wave being obtained from signal adder 54. This wave is coupled to green signal envelope detector 59 which demodulates the carrier wave and provides a green representative signal which is coupled to matrix 48.

FIG. 4a(9) shows the resultant wave obtained from blue signal adder 55 as the waveform coupled to its input terminals are combined. The waveforms which are combined by signal adder 55 are shown in FIGS. 4a(3), 4a(5) and 4a(8). The effect of the comb filter on these signals is to shift their phase such that each carrier wave is 120° out of phase with the other two carrier waves thereby producing zero signal when combined by adder 55. Therefore, there is no signal provided by blue signal adder 55 in response to green representative signals.

FIG. 4b shows a color encoding grating 43b comprising alternating yellow stripes 66 and transparent stripes 67. This grating encodes blue light and the amount of blue light determines the amplitude modulates of the carrier wave produced as the imaged pattern of blue encoding grating 43b is scanned. As previously described, the angle of inclination of encoding stripes 66 and 67 with relation to the horizontal scanning lines is equal and opposite to the angle of inclination of encoding stripes 64 and 65 of encoding grating 43a. Therefore, during three successive scanning intervals during which scanning lines L1, L3 and L5 are scanned the blue color representative amplitude modulated carrier waves will be 120° phase shifted from one scanning line to the other.

FIG. 4b(4) shows the resultant waveform obtained at the output of red signal adder 50 as the three blue color signal carrier wavforms of FIGS. 4b(1), 4b(2) and 4b(3) are combined by signal adder 50. The three waveforms being 120° out of phase with each other, the resultant signal is zero.

FIG. 4b(7) shows a resultant waveform obtained from green signal adder 54 as the three green color representative carrier waves shown in FIGS. 4b(1), 4b(5) and 4b(6) are combined. The comb filter shifts the phase of these three carrier waves such that each is phase shifted 120° with respect to the other two so that the resultant signal obtained from green signal adder is zero in the presence of blue color carrier waves.

FIG. 4b(9) shows the resultant waveform of the signal obtained from blue signal adder 55 as the blue representative color carrier waves shown in FIGS. 4b(3), 4b(5) and 4b(8) are combined by blue signal adder 55. The comb filter operates to shift the phase of these three blue color signals such that they are in phase at the input terminal of signal adder 55, thereby resulting in a relatively large blue carrier resultant wave. The blue carrier wave obtained from blue signal adder 55 is coupled to blue color envelope detector 60 which demodulates the wave and provides a blue color representative signal which is coupled to matrix 48.

It should be noted that there are many combinations of stripe pair widths and angles of inclination of the encoding gratings utilized in the systems shown in FIGS. 1 and 3 which will provide different color representative carrier waves having the same nominal color frequency. The particular choice depends on how wide a luminance channel bandwidth is desired, at what nominal frequency it is desired to place the color carrier waves, and what is the upper frequency limit of a particular system. The invention, allowing a plurality of amplitude modulated color representative carrier wave components and their sidebands to occupy the same frequency range, may be utilized for almost any desired carrier frequency as long as the comb filter phase delay matches the phase change of the phase-changing carrier wave component derived from successive scanning lines.

Figure 5:
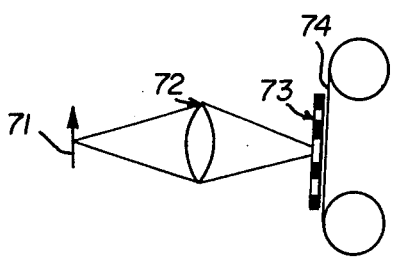
FIG. 5 is a diagram of a camera for encoding light from a scene onto black and white film.

The invention may readily be utilized in a film camera system by utilizing the described encoding filter assemblies to spatially encode scene light onto a black and white film in a film camera shown in FIG. 5. In FIG. 5 light from object 71 is focused by lens 72 through spatial filter 73 onto black and white film 74, thereby spatially encoding light from object 71 upon film 74. The processed film may be subsequently illuminated by a light source for making a record on any desired medium. Or, the encoded film may be illuminated and its image projected directly upon an image pickup tube of a television camera for producing a composite signal which may be processed by apparatus similar to that shown in FIGS. 1 and 3 for producing color representative signals suitable for application to a color display device.

What is claimed is:

1. A system for generating three coherent color component signals from a composite image having a first color spatially modulated in a stripe pattern with a first orientation, a second color spatially modulated in a stripe pattern with a second orientation, and a third color spatially modulated in a stripe pattern with a third orientation, comprising:
    means for scanning said image in a line pattern and for generating signals representative of the scanned image;
    delay means responsive to the output of said scanning means for simultaneously deriving first, second and third video signals generated during three successive scanlines; and
    first, second and third combining means, each of which combines the three video signals in a different phased relationship to generate one of the coherent color component signals.

2. A system in accordance with claim 1 wherein each of said combining means adds the three video signals in a different phase relationship to generate one of the color component signals.

3. A system in accordance with claim 2 wherein said first combining means adds said first, second and third video signals in phase, and said second combining means adds said first, second and third video signals in phase relationships that are multiples of 120°.

4. A system in accordance with claim 1 further comprising means for filtering the signals from said scanning means to produce luninance signals.

5. A system in accordance with claim 1 wherein the three modulating colors are yellow, cyan and magenta.

6. A system for producing signals representative of a scene, comprising:
    an image scanning pickup device;
    color encoding filter means disposed between said scene and a photosensitive electrode of said image pickup device for encoding light from said scene such that colored light information is derived as modulation of a composite signal derived from said image pickup device as said electrode is scanned,
    said filter comprising a plurality of superimposed gratings for encoding a plurality of colors, the stripes of at least one of said gratings being angularly disposed with respect to the stripes of the other of said gratings, said stripes of each of said gratings having widths such that said composite signal includes a plurality of amplitude modulated color representative carrier wave components having the same frequency during a scanning interval,
    at least one of said gratings having its stripes angularly disposed from the direction of scanning such that at least one component wave of said composite signal has a phase change on successively scanned lines; and at least
    first and second signal processing means coupled to said image pickup device for combining signals derived from a plurality of scanning lines for producing a plurality of color representative signals.

7. A system for producing signals representative of a scene according to claim 6, wherein
    the transmissivity of said color encoding filter is selected such that the average transmissivity of said filter is representative of the brightness of said scene; and
    means are coupled to said image pickup device for producing a signal representative of the brightness of said scene.

8. A color encoding system for producing a plurality of color representative signals derived from a plurality of amplitude modulated color representative carrier wave compounds and their associated sidebands, at least two of said carrier wave components having the same frequency, comprising:
    an image scanning pickup device;
    striped spatial color encoding filter means disposed between a scene and a photosensitive electrode of said image pickup device, said filter means comprising at least two superimposed gratings for spatially encoding first and second colors, respectively, of said scene,
    the stripes of each of said gratings being angularly disposed relatively to the stripes of the other, the stripes of at least two of said gratings having widths selected such as to produce at least two of said carrier wave components having substantially the same frequency during a scanning interval, the stripes of at least one of said gratings being disposed at such an angle relative to the direction of scanning lines on a photosensitive electrode of said image pickup device that a carrier wave component produced as the imaged pattern of said at least one grating on said photosensitive electrode is scanned changes phase relative to the start of scan on successive scanning lines, and means coupled to said image pickup device for processing the composite signals obtained from said image pickup device, including;

means for delaying said composite signal for a period substantially equal to the interval of one of said scanning lines;

means coupled to said delaying means and said image pickup device for shifting the phase of said signals, and combining means coupled to said delaying means, said phase shifting means and said image pickup device for producing separate signals each representative of a color of said scene.

9. A color encoding system for producing a plurality of color representative signals according to claim 8 wherein:

the transmissivity of the stripes of said encoding filter is selected such that the average transmissivity of said filter is representative of the brightness of said scene;

means are coupled between said image pickup device and said processing means for separating said brightness and color representative signal components; and means are coupled to said image pickup device for producing a brightness representative signal.

10. A color encoding system for producing a plurality of color representative signals according to claim 9 including means for combining said brightness signal and said color representative signals for producing a brightness signal and a plurality of color difference signals.

11. A camera for encoding color information onto a black and white film for producing color representative signals when subsequently scanned, comprising:

a black and white film;

a striped spatial color encoding filter assembly disposed between said film and a scene;

means for imaging said scene and said color encoding filter assembly onto said film for encoding scene light and forming a record of said encoded light on said film;

said spatial color encoding filter assembly including first and second superimposed encoding gratings for encoding first and second colors, the direction of the stripes of said first grating being angularly disposed from the direction of the stripes of said second grating, the width of the stripes of said first and second gratings being selected such that subsequent scanning of said encoded film produces a signal including first and second carrier wave components resulting from scanning said first and second encoding gratings, respectively, the carrier frequency and sidebands of both groups of components having the same frequency during a single line scanning interval, at least one of said carrier wave component groups having a phase change on successive scanned lines.

12. A system for producing signals representative of the color of a scene, comprising:

an image scanning pickup device;

striped spatial color encoding filter means comprising at least first and second gratings for encoding at least first and second colors, said gratings being disposed between said scene and a photosensitive electrode of said image pickup device for filtering the scene light reaching said electrode such that a composite signal representative of the color of said scene is derived from said image pickup device during scanning of said photosensitive electrode, the encoding stripes of each of said gratings being angularly disposed relative to the stripes of each other grating, said stripes of each of said gratings having a width such that said scanning produces said composite signal including a plurality of amplitude modulated color representative carrier wave components having the same frequency during a scanning interval; and means coupled to said image pickup device for combining signals derived from a plurality of successively scanned lines for producing separate and simultaneous signals representative of a plurality of colors including first signal adder means;

first delaying means for delaying said signals for a period equal to the period of one line scanning interval coupled between said image pickup device and said first signal adder means; and first means for coupling an undelayed signal from said image pickup device to said first signal adder means for producing a signal representative of a first color of said scene.

13. A system for producing signals representative of the color of a scene according to claim 12 wherein said means for combining signals further includes:

second signal adder means;

signal phase shifting means coupled between a signal output terminal of said first delaying means and a signal input terminal of said second signal adder means; and second means coupling said undelayed signal from said image pickup device to said second signal adder means for producing a signal representative of a second color of said scene.

14. In a system for reproducing a color image from composite signals having signal components formed from spatial modulations of a first color in a first line pattern and spatial modulations of a second color in a second line pattern having a directional orientation different from the first line pattern where the composite signal represents successive line intervals on the composite image and where the signal modulations produced from the modulations of the first color have a first phase relationship in successive lines of scan and where signal modulations of the second color have a second phase relationship different from the first phase relationship in the successive lines of scan;

means responsive to the first phase relationship for operating upon the signals representing the composite image to recover from such signals the signal components having the first phase relationship and representing the first color;

means responsive to the second phase relationship for operating upon the signals representing the composite image to recover from such signals the signal components having the second phase relationship and representing the second color; and means for operating upon the signal components representing the first and second colors to obtain a reproduction of the color image.

15. In the system set forth in claim 14, a composite image being provided on a black-and-white medium with a representation of a first color modulated in the first line pattern and a representation of a second color modulated in the second line pattern and means being provided for scanning the composite image to produce signals representing the composite image.

16. In a system for reproducing a color image from composite signals having signal components formed from spatial modulations of a first color in a first line pattern and spatial modulations of a second color in a second line pattern having a different angular relationship from the first line patterns where the composite signals represent periodic phase relationships between the two modulations in successive pairs of line intervals taken in a direction different from either modulator and where the two modulations have the same frequency in successive pairs of line intervals corresponding to the direction of sweep of a beam;
  electronic means responsive to the relative phase of the composite signals representing successive lines of the composite image in the direction of sweep of the beam to recover from such signals the signal component representing the first color;
  electronic means responsive to the relative phase of the composite signals representing successive line intervals of the composite image in the direction of sweep of the beam to recover from such signals the signal components representing the second color;
  electronic means responsive to the composite signals in the sweep of the beam for producing signals representing the luminance of the color image; and
  electronic means for operating upon the signals representing the first and second colors and the luminance to obtain a reproduction of the color image.

17. In the system set forth in claim 16, a composite image being provided on a black-and-white medium with a representation of a first color modulated in the first line pattern and a representation of a second color modulated in the second line pattern and means being provided for scanning the composite image to produce signals representing the composite image.

18. In a method of producing on a black-and-white medium a composite image of a color image, the steps of:
  providing spatial modulations in a first particular line pattern and having a first particular frequency and a first phase relationship to represent a first particular color;
  providing spatial modulations in a second particular line pattern having a directional orientation different from the first particular line pattern and having the first particular frequency and a second phase relationship different from the first phase relationship to represent a second particular color; and
  exposing the color image on the black-and-white medium with the first and second spatial modulations.

19. In a method of producing a composite image on a black-and-white medium where the composite image is subsequently scanned in successive lines on the image, the steps of:
  providing a first filter having first spatial modulations in a first particular line pattern, the spatial modulations providing a first particular phase relationship and a first particular frequency in the successive scan lines to represent a first particular color;
  providing a second filter having second spatial modulations in a second particular line pattern having a directional orientation different from the first particular line pattern, the second spatial modulations providing in successive scan lines the first particular frequency and a second particular phase relationship different from the first particular phase relationship to represent a second particular color; and
  exposing the color image on the black-and-white medium with the first and second spatial modulations.

20. In a method of producing a composite image of a color image, the steps of:
  providing a first filter spatially modulated in a first particular line pattern defined by a first particular frequency and a first phase relationship to control the passage of signals representing a first particular color in accordance with the first particular line pattern;
  providing a second filter spatially modulated in a second particular line pattern defined by the first particular frequency and a second phase relationship different from the first phase relationship and having a directional orientation different from the first particular line pattern to control the passage of signals representing a second particular color in accordance with the second particular line pattern; and
  scanning the color image to produce signals representing the color image and respectively modulated by the first and second filters in the first and second line patterns.

21. In a system for producing a color image including a means for providing a sweep of a beam in a particular direction,
  a grating having a first plurality of equally spaced, substantially parallel lines defined by a first frequency and a first phase relationship in the direction of said beam sweep and spatially modulated in a first line pattern disposed in a first direction relative to the direction of sweep and a plurality of equally spaced, substantially parallel lines defined by the first frequency and a second phase relationship different from the first phase relationship in the direction of said beam sweep and disposed in a second direction different from the first direction, the first plurality of substantially parallel, equally spaced lines having a spacing and disposition relative to the second plurality of substantially parallel, equally spaced lines to provide a common frequency with the second plurality of substantially parallel, equally spaced lines in accordance with the sweep of said beam, the first plurality of substantially parallel, equally spaced lines having a relative disposition to provide a first phase relationship for a the first color in successive lines of scan and the second plurality of substantially parallel, equally spaced lines having a relative disposition to provide a second phase relationship different from the first phase relationship for a the second color in successive lines of scan.

22. A video system comprising:
  a target,
  means for periodically scanning the target along horizontal lines to produce representations of image patterns on said target as an electrical signal having energy at discrete frequencies, a first grating having stripes alternately providing high and low transmission of a first image positioned to form a striped pattern of said first image on said target, a second grating having stripes alternately providing high and low transmission of a second image positoned to form a striped pattern of said second image on said target, a third grating alternately providing high and low transmission of a third image positioned to form a striped pattern of said third image on said target, said gratings being positioned so that the striped patterns of said first, second and third images are superimposed on said target, the striped pattern of said third image being oriented vertically and the striped patterns of said first and second images being angularly oriented to each other and to the pattern of said third image, the densities of each of said first, second and third gratings and the relative angles between their corresponding striped patterns being selected such that each grating provides essentially the same periodicity of high and low transmission in the direction of the scan, the components of said electrical signal representing said first, second and third images all having substantially the same carrier frequency, and the energy of the components representing the first and second images being distributed exclusively at discrete frequencies between successive multiples of the line frequency of said scanning means, and comb filter means for separating said electrical signal by virtue of the frequency distribution into three independent signals, each representative of one of said three images.

23. A system for producing signals representative of scene, comprising:

an image scanning pickup device;

color encoding filter means disposed between said scene and a photosensitive electrode of said image pickup device for encoding light from said scene such that colored light information is derived as modulation of a composite signal derived from said image pickup device as said electrode is scanned, said filter comprising three superimposed gratings for encoding three colors, the stripes of at least one of said gratings being angularly disposed with respect to the stripes of the other of said gratings, said stripes of each of said gratings having widths such that said composite signal includes a plurality of amplitude modulated color representative carrier wave components having the same frequency during a scanning interval, at least two of said gratings having its stripes angularly disposed from the direction of scanning such that at least two component waves of said composite signal have a phase change on successively scanned lines; and first, second and third signal processing means coupled to said image pickup device for combining signals derived from a plurality of scanning lines for producing signals representative of first, second, and third colors, respectively, said first, second, and third signal processing means including means for delaying said signals for periods equal to the periods of one and two scanning lines for enabling said signals derived from a first and two next preceding scanning lines to be combined; and said first, second, and third signal processing means including means for combining said signals derived from said three scanning lines in different phases for producing said first, second, and third color representative signals.

24. A system for generating three coherent color component signals representative of the color content of a scene, comprising:

a color stripe filter disposed in the optical path of the scene, said filter having three sets of parallel stripes, each set having a different characteristic color and a different orientation in the plane perpendicular said path;

means for electronically scanning the image projected through said filter in a line pattern and for generating signals representative of the filtered image;

delay means responsive to the output of said scanning means for simultaneously deriving first, second, and third video signals generated during three successive scanlines; and first, second and third combining means, each of which combines the three video signals in a different phase relationship to generate one of the coherent color component signals.

25. A system in accordance with claim 24 wherein each of said combining means adds the three video signals in a different phase relationship to generate one of the color component signals.

26. A system in accordance with claim 24 wherein the orientation of one of said sets of stripes is such that the scanning of said one set of stripes on a particular line produces a video signal component that is shifted in phase by $+120°$ with respect to the video signal component produced when said one set of stripes is scanned on the next line.

27. A system in accordance with claim 26 wherein the orientation of a second of said sets of stripes is such that the scanning of said second set of stripes on said particular line produces a video signal component that is shifted in phase by $-120°$ with respect to the video signal component produced when said second set of stripes is scanned on said next line.

28. A system in accordance with claim 27 wherein the orientation of the third of said sets of stripes is such that the scanning of said third set of stripes on said particular line produces a video signal component that is in phase with respect to the video signal component produced when said third set of stripes is scanned on said next line.

29. A system in accordance with claim 25 wherein said first combining means adds said first, second and third video signals in phase, and said second combining means adds said first, second and third video signals in phase relationships that are multiples of $120°$.

30. A system in accordance with claim 24 further comprising means for filtering the signals from said scanning means to produce luminance signals.

31. A system in accordance with claim 24 wherein the three stripe set colors are yellow, cyan and magenta.

32. A system for producing signals representative of the color of a scene, comprising:

an image scanning pickup device;

striped spatial color encoding filter means comprising at least first and second gratings for encoding at least first and second colors, said gratings being disposed between said scene and a photosensitive electrode of said image pickup device for filtering the scene light reaching said electrode such that a composite signal representative of the color of said scene is derived from said image pickup device during scanning of said photosensitive electrode, the encoding stripes of each said gratings being angularly disposed relative to the stripes of each other grating, said stripes of each of said gratings having a width such that said scanning produces said composite signal including a plurality of amplitude modulated color representative carrier wave components having the same frequency during a scanning interval; and means coupled to said image pickup device for combining signals derived from a plurality of successively scanned lines for producing separate and simultaneous signals representative of a plurality colors.

33. A system for producing signals representative of the color of a scene according to claim 32 wherein said stripes of said filter are selected such that the average transmissivity of said filter is representative of the brightness of said scene; and means are coupled to said image pickup device for producing a brightness representative signal.

* * * * *